(12) United States Patent
Eckrich et al.

(10) Patent No.: US 8,330,528 B2
(45) Date of Patent: Dec. 11, 2012

(54) ACTIVE SENSOR WITH OPERATING MODE CHANGEOVER

(75) Inventors: Jörg Eckrich, Wiesbaden (DE); Ralf Klausen, Frankfurt (DE); Timo Dietz, Hochheim am Main (DE); Wolfgang Fritz, Gießen (DE); Wolfgang Jöckel, Gersfeld (DE)

(73) Assignee: Continental Teves AG & Co. oHG (DE)

( * ) Notice: Subject to any disclaimer, the term of this patent is extended or adjusted under 35 U.S.C. 154(b) by 456 days.

(21) Appl. No.: 12/377,280

(22) PCT Filed: Aug. 17, 2007

(86) PCT No.: PCT/EP2007/058554
§ 371 (c)(1),
(2), (4) Date: Jul. 12, 2010

(87) PCT Pub. No.: WO2008/022968
PCT Pub. Date: Feb. 28, 2008

(65) Prior Publication Data
US 2010/0277224 A1    Nov. 4, 2010

(30) Foreign Application Priority Data

Aug. 21, 2006  (DE) .......................... 10 2006 038 970
Jun. 9, 2007   (DE) .......................... 10 2007 026 786

(51) Int. Cl.
*G11C 5/14* (2006.01)

(52) U.S. Cl. ....................................... 327/530; 324/609
(58) Field of Classification Search .................. None
See application file for complete search history.

(56) References Cited

U.S. PATENT DOCUMENTS

| 4,511,896 | A |  | 4/1985 | Cousins, III |
| 5,606,252 | A |  | 2/1997 | Gschossmann et al. |
| 6,215,297 | B1 |  | 4/2001 | Bleckmann et al. |
| 6,867,581 | B1 |  | 3/2005 | Bendicks et al. |
| 7,830,155 | B2 | * | 11/2010 | Zarkhin ........................ 324/605 |
| 2004/0249544 | A1 |  | 12/2004 | Lohberg |

FOREIGN PATENT DOCUMENTS

| DE | 44 34 978 A1 | 4/1996 |
| DE | 102 03 483 A1 | 11/2002 |
| EP | 0 684 480 A1 | 11/1995 |
| JP | 11-045384 | 2/1999 |

* cited by examiner

*Primary Examiner* — Cassandra Cox
(74) *Attorney, Agent, or Firm* — RatnerPrestia

(57) ABSTRACT

Active sensor for switching over into a special operating mode, wherein the sensor has at least one sensor element, one evaluation circuit and two connecting lines, each with a terminal for transmitting the sensor information, wherein a supply voltage of the sensor is applied to the two connecting lines, wherein the sensor comprises a switchover module with which it is possible to switch over between a normal operating mode and a special operating mode by reversing the polarity of the supply voltage which is applied to the two terminals. A method for actuating an active sensor and to the use of the sensor, in particular as a wheel speed sensor, in motor vehicles.

18 Claims, 3 Drawing Sheets

ACTIVE SENSOR WITH OPERATING MODE CHANGEOVER

CROSS REFERENCE TO RELATED APPLICATIONS

This application is the U.S. national phase application of PCT International Application No. PCT/EP2007/058554, filed Aug. 17, 2007, which claims priority to German Patent Application No. DE102006038970.0, filed Aug. 21, 2006 and German Patent Application No. DE102007026786.1, filed Jun. 9, 2007, the contents of such applications being incorporated by reference herein.

BACKGROUND OF THE INVENTION

1. Field of the Invention

The invention relates to an active sensor, a method for actuating an active sensor, and to the use of the active sensor in motor vehicles.

2. Description of the Related Art

An active sensor with a two-wire interface is described in document DE 44 34 978 A1, said sensor having a test mode for sensing a critical length of air gap between the sensor and encoder, wherein it is possible to switch over between the normal operating mode and this test mode by changing the operating voltage by virtue of the fact that the sensor is actuated with a serial voltage bit pattern.

Document DE 102 03 483 A1 proposes a wheel speed sensor which can be operated in different modes and has different modes of data transmission, wherein it is possible to switch over between these operating modes by external actuation by means of an additional input.

SUMMARY OF THE INVENTION

An object of the invention is to propose an active sensor which, in addition to the normal operating mode, has at least a second operating mode and can be switched over between these operating modes. In this context, in particular a simple and reliable method of actuation for switching over the operating mode is intended to be possible.

The invention relates to the idea of proposing an active sensor with switching over of the operating mode, wherein the switching over of the operating mode is carried out by reversing the polarity of the supply voltage, and/or the sensor is configured for such actuation for switching over the operating mode.

By virtue of the at least two operating modes and their switching over by reversing the polarity of the supply voltage, it is possible to use the sensor according to the invention to implement, in particular, both undervoltage detection and a test mode.

Actuating the sensor for switching over the operating mode by reversing the polarity of the supply voltage is a particularly reliably detectable and simple actuation process. The risk of this type of actuation undesirably being carried out during operation, for example due to inputting of an interference signal, is low.

A sensor element is preferably understood to be a magnetic field sensor element which functions on the basis of the Hall effect or of one of the various magneto-resistive effects, in particular the anisotropic magneto-resistive effect.

The sensor can be operated at least in a normal operating mode and a special operating mode. These operating modes preferably have further sub-operating modes. In particular, the sensor comprises switchover means with which the assignment of additional information to defined transmission channels of the sensor output signal can be changed by switching over between sub-operating modes, particularly preferably like a sensor arrangement or a corresponding exemplary embodiment according to document DE 102 03 483 A1. Switching over between sub-operating modes is particularly preferably carried out as a function of the operating state of the sensor and/or as a function of defined parameters, which are particularly preferably acquired by means of the sensor.

A normal operating mode of the sensor is expediently understood to be the operation in which the at least one specified measurement variable is acquired by means of the sensor and processed, and is made available, in particular in an essentially fault-free state, as a measured value contained in a sensor output signal. In the normal operating mode or during normal operation of the sensor, the supply voltage is connected with the provided polarity thereto, that is to say "+" to "+" and "−" to "−". The normal operating mode of the sensor is particularly preferably defined in that a defined minimum supply voltage is available to the sensor, particularly preferably a supply voltage or working voltage between essentially 4V and 28V.

The output signal of the sensor is preferably transmitted to an electronic control unit, in particular an electronic control unit of a motor vehicle control system.

It is expedient that the sensor is configured in such a way that the switching over of the operating mode is carried out automatically, in particular on the basis of actuation on the connecting lines.

The switchover module preferably has a rectifier circuit, in particular a bridge rectifier circuit, which is particularly preferably embodied from four Mos-FETs for avoiding the voltage drop occurring at diodes. The rectifier circuit is connected on the input side to the two connecting lines of the sensor. The rectifier circuit also always makes available a rectified voltage at its outputs after reversal of the polarity of the supply voltage, which rectified voltage is used as a supply voltage for at least certain components of the sensor at which reversal of the polarity of their supply voltage has to be avoided. The rectifier circuit additionally has the effect of a general polarity reversal prevention means.

The switchover module expediently has at least a first comparator circuit for identifying the polarity of the supply voltage of the sensor, wherein the first comparator circuit is directly or indirectly connected, in particular on the input side, to the two connecting lines of the sensor, particularly preferably by means of a voltage divider. Alternatively, the first comparator circuit preferably senses the supply voltage of the sensor by sensing the voltage drop across a rectifier component, in particular across a diode or a transistor of the bridge rectifier circuit.

The power supply terminals of the first comparator circuit and/or of the evaluation circuit are preferably connected to the output terminals of the rectifier circuit, as a result of which the power supply for the above components is made independent of the polarity of the sensor supply voltage.

The switchover module expediently has at least one reset device for evaluating its own operating voltage and/or the operating voltage of the evaluation circuit with respect to at least one defined voltage threshold, which is embodied, in particular essentially, as a comparator circuit and is connected by its supply terminals to the output terminals of the rectifier circuit. The switchover module particularly preferably has a first reset device which senses possible upward transgression of a defined voltage threshold, and a second reset device which senses possible undershooting of a defined voltage threshold. These two voltage thresholds are quite particularly preferably equal in value, which permits plausibility checking of the two reset device outputs.

It is preferred that the switchover module has a switching device, in particular embodied as a switch, for switching over the operating mode, which switches over the operating mode of the sensor as a function of the output of the first comparator circuit for identifying the polarity of the supply voltage of the sensor and as a function of the output or outputs of the at least one reset device. As a result of this, the evaluation circuit can be actuated either as a function of the polarity of the sensor or as a function of the supply voltage amplitude, and an internal operating mode or sub-operating mode can be set.

The evaluation circuit preferably has a signal processing device comprising two hysteresis circuits in which a first and a second output signal of the at least one sensor element are processed, wherein these two hysteresis circuits are connected in parallel and each comprise at least one comparator. The first and second output signals of the at least one sensor element are each applied here to the inputs of the two comparators interchanged with one another with respect to the non-inverting input and the inverting input. As a result, at each comparator the voltage difference between the two output signals of the at least one sensor element which is inverted with respect to said voltage difference of the other comparator is present on the input side, as a result of which an asymmetrical switching behavior of the two hysteresis circuits is implemented. In particular, a voltage divider is connected to each of the inverting inputs of the two comparators of the hysteresis circuits. Said voltage divider is composed of a first and a second resistor at a first node between these two resistors. The first resistor is connected by the terminal, opposite the first node, to the signal line of the corresponding first or second output signal of the at least one sensor element, and the second resistor is connected by the terminal, opposite the first node, to a connecting terminal, in particular the connecting terminal of the negative potential, of the supply voltage of the at least one sensor element, via a transistor. In this context, the gate/base terminal of this transistor, in particular of a MosFET, is connected in each case to the output of the respective comparator. As a result, a hysteresis effect is produced when the respective comparator is switched over. The first and second resistors of the two hysteresis circuits particularly preferably have, in each case on a paired basis, temperature coefficients which are different from one another, as a result of which certain temperature influences with respect to the at least one sensor element on the switching behavior of the hysteresis circuits can be avoided. In each case the first resistor of the two hysteresis circuits is quite particularly preferably an essentially temperature-independent resistor and the respective second resistor has a defined, positive or negative temperature coefficient, in particular depending on the temperature coefficient of the output signal amplitude of the sensor element. This configuration of the voltage dividers or of the resistors makes it possible to ensure that the difference in amplitude between the two output signals of the at least one sensor element always periodically exceeds the hysteresis threshold even when strong heating occurs.

The evaluation circuit preferably also has an interface circuit for setting a defined output signal of the sensor, wherein this interface circuit is actuated by the switch device as a function of the respective operating mode and/or as a function of the output of at least one reset device. The interface circuit comprises, in particular, at least one current mirror and/or one or more power sources for setting a defined power level of the sensor output signal.

It is expedient that the switch device switches off and/or leaves switched off the circuit branch of the interface circuit which is used to modulate the sensor output signal by means of the signal processing unit, in a first case defined by the presence of an operating voltage for the evaluation circuit below a defined threshold voltage and the polarity of the supply voltage which is applied to the sensor corresponding to the normal operating mode, and in a second case defined by the presence of an operating voltage of the evaluation circuit above a defined threshold voltage and the polarity of the supply voltage which is applied to the sensor corresponding to a special operating mode, by means of a switch of the interface circuit, and otherwise, that is to say when the two cases defined above are not present, switches on and/or leaves switched on said circuit branch. As a result, undervoltage in the normal operating mode and overvoltage in the special operating mode can be indicated by switching off the modulation of the sensor output signal or detected by an electronic control unit.

It is expedient that the evaluation circuit additionally has a voltage stabilization unit, in particular implemented by means of a shunt controller, particularly preferably by means of a Zener diode, for stabilizing the supply voltage of the at least one sensor element, and/or a power source which essentially drives a reference current for forming a sensor output current signal, and/or a reference voltage unit for making available a reference voltage, wherein this reference voltage is made available in particular to the signal processing unit, particularly preferably to the operational amplifiers of the signal processing unit, the power source and the voltage stabilization unit.

It is preferred that the sensor is a wheel speed sensor and is correspondingly configured.

It is expedient that the sensor is embodied at least partially as an integrated circuit, in particular as an ASIC.

The entire sensor, in particular certain parts such as the sensor elements and/or the evaluation circuit and the switchover module, is preferably integrated on one chip.

For the embodiment of the sensor as a wheel speed sensor, the latter expediently has a test operating mode, wherein the sensor in such a test operating mode operates, for example, with a supply voltage of 3V to 4V. Such a test operating mode serves in particular to check the correct installation of the sensor in a wheel speed sensor arrangement of a motor vehicle. In this context, the supply voltage of the sensor is reduced for as long as the sensor signal is absent. The voltage at which a sensor signal no longer occurs, or the sensor can no longer sense encoder movements and can no longer transmit the corresponding signal, is a measure of the installation quality of the sensor and permits conclusions to be drawn about the length of the magnetic air gap between the encoder and sensor element and the corresponding air gap reserve in the normal operating mode.

With respect to the method it is preferred to switch over the sensor by reversing the polarity of the supply voltage from the normal operating mode into a test operating mode in order to determine the air gap between an encoder and the sensor or the at least one sensor element. After this, the supply voltage is reduced, starting from a defined voltage value, until the sensor no longer supplies an output signal which is modulated by the encoder movements and has a defined minimum amplitude. As a result, the above-described installation quality of the sensor can be evaluated and the length of the air gap between the encoder and sensor element can be sensed.

As an alternative, the method according to aspects of the invention is preferably developed by switching over the sensor from the normal operating mode into a programming mode by reversing the polarity of the supply voltage. After this, data for programming and/or calibrating the sensor is transmitted from an electronic control unit to the sensor. This method of switching over into a programming mode is relatively simple and robust with respect to faults.

The invention also relates to the use of the sensor according to aspects of the invention, in particular as a wheel speed sensor, in motor vehicles.

The sensor according to aspects of the invention is preferably used in deployment areas which are critical for safety, in particular in motor vehicles. In this context, said sensor is particularly preferably used to sense linear and/or rotational movements. A test operating mode of the sensor is quite particularly preferably used to be able to assess the installation quality and the air gap reserve after the sensor has been installed in the respective sensor arrangement, in particular at the manufacturer's premises. As a result, the operational quality and safety of low cost sensors, which have no possibility of independent sensing of the length of the air gap, can be improved.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following schematic illustration.

DETAILED DESCRIPTION OF THE PREFERRED EMBODIMENTS

Figure 1:
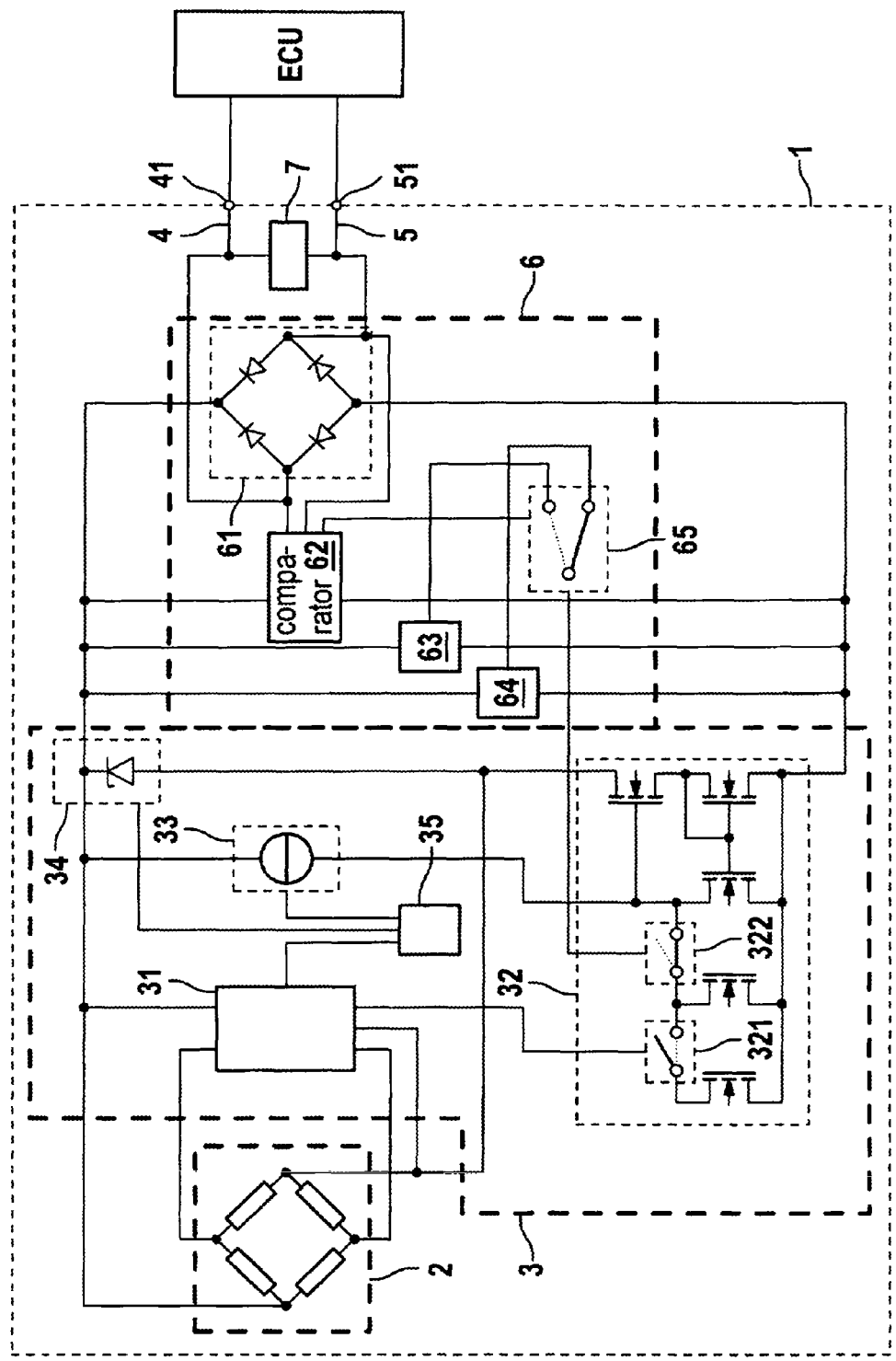
FIG. 1 shows an exemplary embodiment of an active sensor as the wheel speed sensor.

FIG. 1 illustrates an exemplary active sensor 1 which is embodied as a wheel speed sensor and has connecting lines 4 and 5 to the terminals 41 and 51 to which additional connecting lines are connected as extensions of the connecting lines 4 and 5. The active sensor 1 is connected via these additional connecting lines to the electronic control unit ECU of a motor vehicle brake system. The sensor output signals are transmitted via connecting lines 4 and 5 or the connecting lines 4 and 5 as an extension with the additional connecting lines, and the supply voltage is made available on these lines 4, 5. The operating mode of the sensor 1 is set or switched over by means of the polarity of the applied supply voltage. Given a polarity "+" at "+" and "−" at "−" the sensor operates in the normal operating mode. Given a polarity "+" to "−" and "−" to "+" the sensor operates in a special operating mode or for example in a test operating mode. In the normal sensor mode, the working voltage range is between 4V and 28V, while in the test operating mode the working voltage range is between 3V and 4V. In the case of voltages higher than 4V, the sensor is in the test operating mode in a reset state. This ensures that incorrect connection of the sensor 1 in the vehicle is noticed immediately. Active sensor 1 comprises a sensor element 2 which is embodied as an AMR sensor bridge, an evaluation circuit 3 and a switchover module 6. The sensor bridge 2 senses the rotational movements of a magnetic encoder (not illustrated) which is permanently connected to a wheel, or the magnetic field which is modulated by the encoder movements. In addition, the sensor 1 has an overvoltage protection unit 7 so that the sensor 1 is not damaged when it is linked to an excessively high voltage. The switchover module 6 for switching over the operating mode comprises the bridge rectifier circuit 61, a first comparator circuit 62, two reset devices 63, 64, which are each embodied, for example, as comparators and which evaluate the supply voltage of the evaluation circuit 3 with respect to, in each case, one defined voltage threshold or reset threshold, specifically once to determine whether the supply voltage of the evaluation circuit 3 is higher than 4V, and another time to determine whether the supply voltage of the evaluation circuit 3 is lower than 4V, and a switch device 65. The comparator circuit 62 is connected to the bridge rectifier circuit 61 in such a way that, as a function of the polarity of the supply voltage of the sensor 1, the comparator circuit 62 switches or does not switch or senses the polarity of the supply voltage of the sensor 1. The rectifier circuit 61 is connected on the input side to connecting lines 4 and 5 and makes available on the output side a rectified voltage as a supply voltage for comparator 62, reset devices 63 and 64, evaluation circuit 3 and sensor element 2. The evaluation circuit 3 comprises a power source which makes available a power signal of defined amplitude for an interface circuit 32. Furthermore, evaluation circuit 3 comprises a signal processing unit 31 which processes the output signals of the sensor element 2 and produces and outputs a digital alternating signal which is modulated in accordance with the encoder movements. Furthermore, the evaluation circuit 3 has a reference voltage unit 35 which makes available a reference voltage with a defined amplitude to the signal processing unit 31, the power source 33 and a voltage stabilization unit 34. The voltage stabilization unit 34 is composed, for example, of a Zener diode with which the supply voltage of the sensor element 2 and, for example, likewise the supply voltage of the signal processing unit 31, which is connected in parallel thereto, are set to an essentially constant defined value. The output signal of the signal processing unit 31 switches on and off the switch 321 of the interface circuit 32 as a function of the encoder movements or the period of the digital output signal of the signal processing unit 31, as a result of which the gain factor of the interface circuit 32 is respectively switched over and the amplitude of the sensor output current signal is varied between two defined amplitude values as a function of said gain factor. The switch device 65 transmits one of the two reset signals of the reset devices 63 and 64 to a switch 322 of the interface circuit 32 as a function of the output of the comparator circuit 62. If this switch 322 is opened, the output signal, modulated by the encoder movements, of the signal processing device 31 is switched off or not passed on. This design has the advantage that an undervoltage reset can be carried out in the normal operating mode in which, in particular, the signal processing device 31 modulates the sensor output signal in a non-clocked fashion or said signal processing device 31 transmits a defined, constant sensor output signal with a low amplitude to the ECU. In addition, an overvoltage reset can be carried out in the test operating mode, during which reset, in particular, the above-mentioned measures are also carried out. Furthermore, the design described above also has polarity reversal protection.

Figure 2:
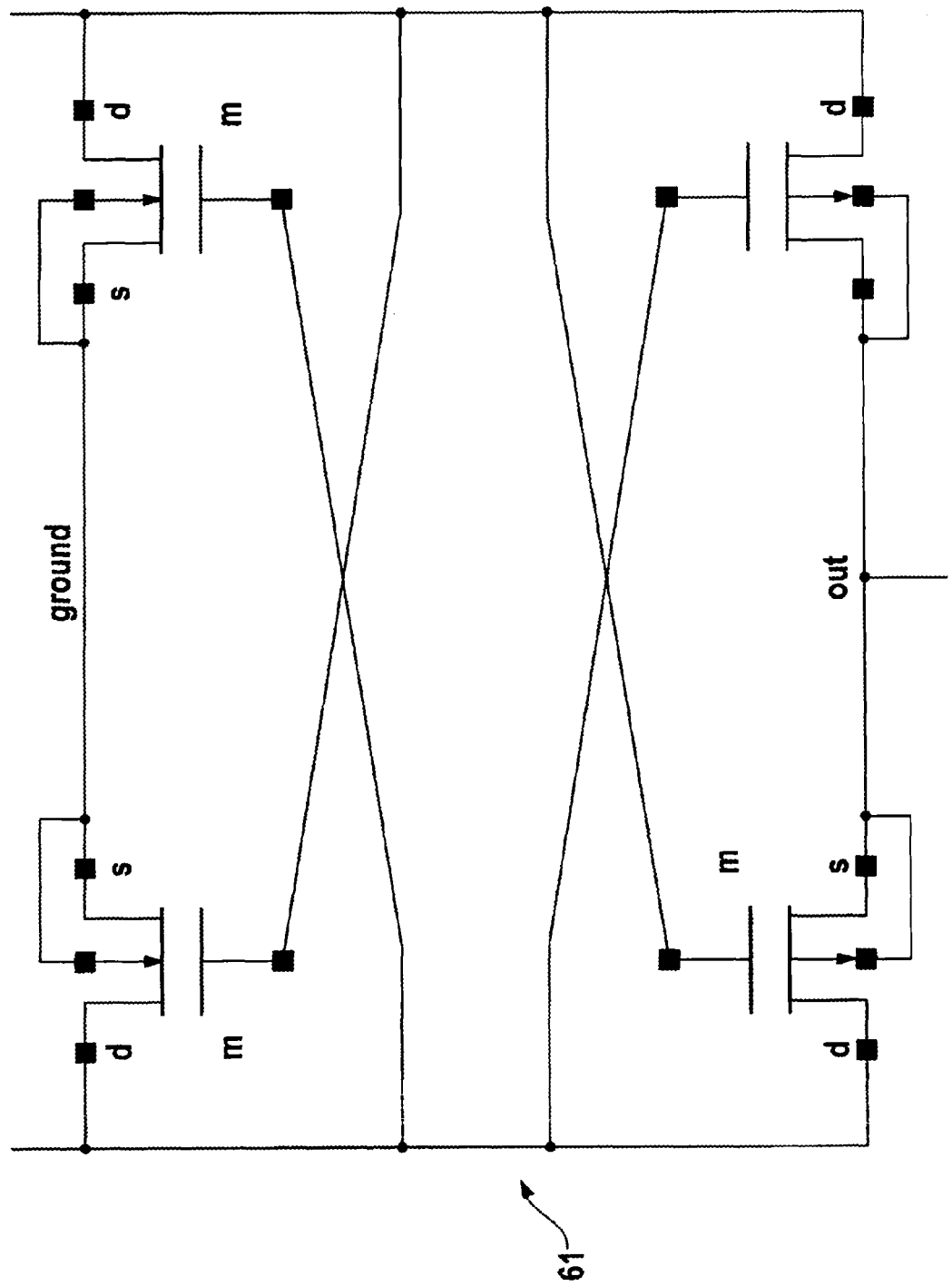
FIG. 2 shows an exemplary embodiment of a bridge rectifier.

FIG. 2 illustrates an exemplary embodiment of a bridge rectifier circuit 61. In a customary bridge rectifier circuit with four diodes, a defined voltage drops across two diodes, and is also referred to as diode drop. The working voltage which is available to the evaluation circuit 3 therefore results essentially from the supply voltage of the sensor 1 minus twice the voltage drop at the p-n junction of a diode (~0.6V to 0.8V).

Since the working voltage in the normal operating mode can be at minimum 4V, the evaluation circuit would only be operated with approximately 2.4V in this case. This is undesired, in particular because further internal voltage drops also occur in the evaluation circuit 3, for example across the interface circuit 32, and as a result an even lower working voltage is available to circuits and/or components which are correspondingly arranged downstream. The bridge rectifier circuit 61 which is illustrated in FIG. 2 uses Mos-FETs instead of the diodes, as a result of which the internal voltage drop of the circuit can be significantly reduced, and a higher working voltage is therefore available to the evaluation circuit 3.

Figure 3:
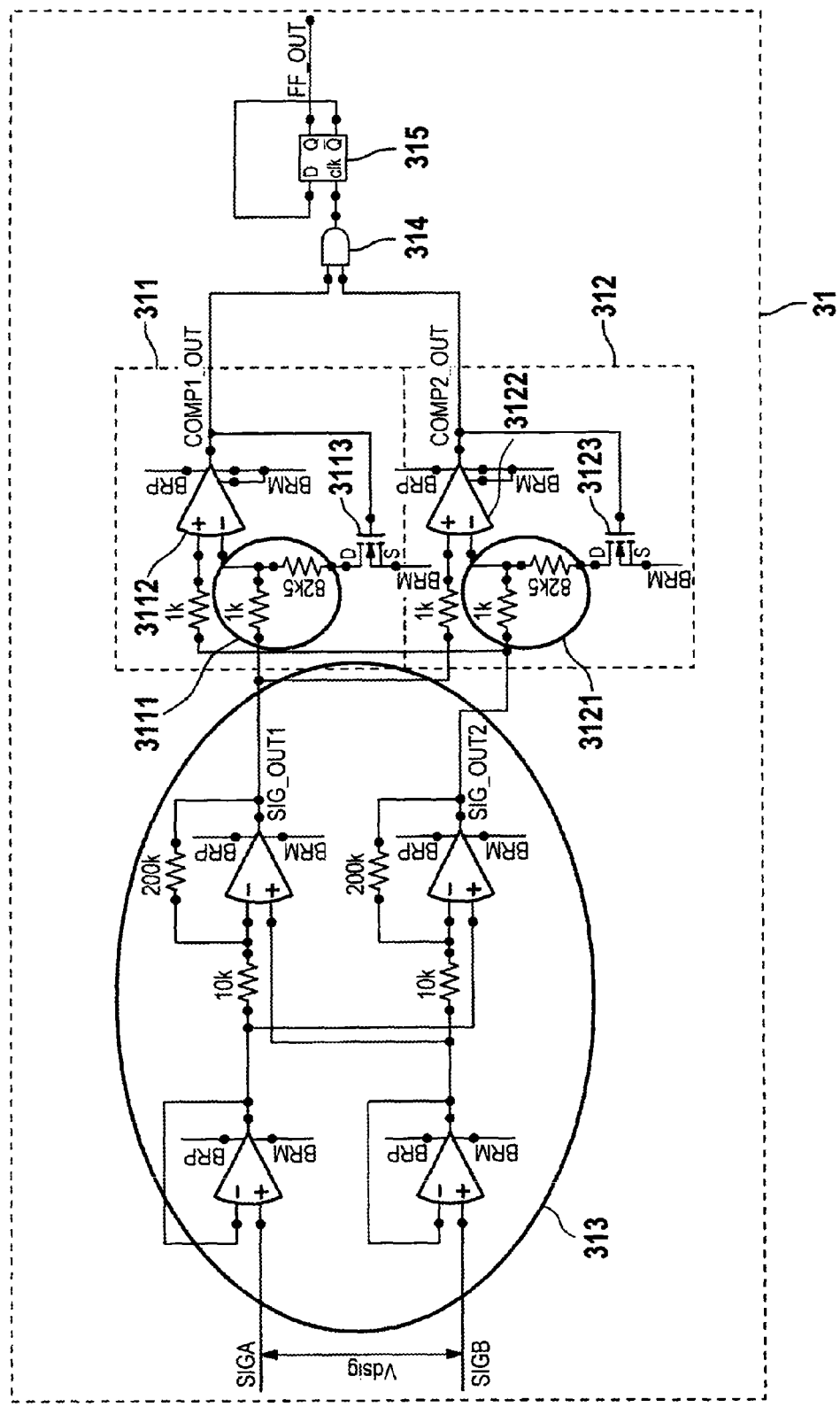
FIG. 3 shows an exemplary signal processing unit with essentially temperature-independent hysteresis circuits.

FIG. 3 shows an exemplary signal processing unit 31. The sensor element output signals SIGA and SIGB and their voltage difference Vdsig, which are phase-shifted by 180° with respect to one another, are connected to the latter. The signal processing unit 31 has an amplifier circuit 313 with four operational amplifiers. As an alternative, according to an exemplary embodiment which is not illustrated, the amplifier circuit 313 can also be formed from at least one instrument amplifier. In addition, the signal processing unit 31 has two hysteresis circuits 311 and 312, an AND gate 314 which is connected on the input side to the outputs of the hysteresis circuits 311 and 312, and a toggle flip-flop 315 which is connected on the input side to AND gate 314. Hysteresis circuits 311 and 312 each comprise a comparator 3112, 3122, embodied as an operational amplifier, a voltage divider 3111, 3121, each with a first resistor 1$k$ and a second resistor 82$k$5 as well as a transistor 3113, 3123. The operational amplifiers are all connected together to the voltage supply of the sensor bridge BRP (Bridge Supply Plus) and RRM (Rridga Simply Minus).

Magnetic field sensor elements, in particular magneto-resistive sensor elements, have, inter alia, the property that as the temperature increases the signal amplitude becomes lower. It is therefore desirable, when converting from analog to digital signals, to adapt the switching hysteresis by means of the temperature of the signal voltage. This is done by means of the voltage dividers 3111 and 3121 which determine the hysteresis and whose two resistors are constructed from different materials with different temperature coefficients. Through corresponding dimensioning, the temperature dependence of the hysteresis voltage can be adapted to the temperature dependence of the signal voltage. Furthermore, the signal processing device 31 and its hysteresis circuits 311 and 312 have an asymmetrical hysteresis with respect to the two comparators 3112, 3122. These comparators 3112, 3122 each switch at the zero crossover or the crossing point of the amplitudes of the two output signals of the amplifier circuit 313 SIG_OUT1 and SIG_OUT2, which results in switching of the two comparators 3112 and 3122 which is independent of the rest of the signal profile of these two signals. The comparator 3112 switches, for example, whenever there is a change in the polarity of the differential voltage applied to its terminals. If the amplitude of SIG_OUT2 exceeds (is applied to "+" of comparator 3112) the amplitude of SIG_OUT1 (is applied to "−" of comparator 3112), a "1" or a high signal is applied to the output of comparator 3112. This "1" switches on transistor 3113, in this case a Mos-FET, in response to which in each case a voltage, resulting from the voltage of SIG_OUT1 and corresponding to the resistance values of the voltage divider 3111, is set at the resistors 1$k$ and 82$k$5. As a result of this switching on of Mos-FET 3113, the potential BRM (Bridge Supply Minus) is applied to the terminal, opposite the comparator, of the resistor 82$k$5, which potential BRM is the negative potential of the supply voltage of the magnetic field sensor bridge. As a result, the potential which is applied to the inverting input of the comparator 3112 becomes more negative. Accordingly, the rise in the amplitude from SIG_OUT1 to the value of the amplitude of SIG_OUT2 is not sufficient for switching over the comparator to a "0" output signal because SIG_OUT2 is not completely applied to the inverting input of the comparator K1 owing to the activated voltage divider. At a higher temperature of the magnetic field sensor bridge—from which a generally lower amplitude of the signals SIG_OUT1 and SIG_OUT2 results—this hysteresis would lead to switching over of the comparator 3112 occurring significantly later than at an average temperature, or above a certain temperature it would not even take place at all because the maximum difference in amplitude between SIG_OUT2 and the proportion of SIG_OUT1 which is applied to the inverting input of comparator 1 would be lower than the hysteresis threshold. For this reason, the resistors 1$k$ and 82$k$5 of the voltage divider have a different temperature coefficient. In this exemplary embodiment, the resistor 1$k$ is configured essentially independently of the temperature, and the resistor 82$k$5 has a positive temperature coefficient in order to compensate for, for example, the negative temperature coefficient of the amplitude profile of the sensor element bridge. As a result, when the temperature rises a higher voltage is present at the resistor 82$k$5, and a relatively high potential is present at the inverting input ("−") of the comparator 3112. This ensures that the difference in amplitude between SIG_OUT2 and the proportion of SIG_OUT1 which is present at the inverting input of comparator 3112 also periodically exceeds the hysteresis threshold when there is a relatively high degree of heating. The method of functioning of the hysteresis circuit 312 corresponds and is inverting with respect to the signal branch of the comparator K1 for the signals SIG_OUT1 and SIG_OUT2. The output signals of the hysteresis circuits 311 and 312 overlap with the high level or the state "1" owing to the hysteresis because the negative edge of one signal occurs later than the positive edge of the other signal, as a result of which a "1" or a positive signal edge occurs at the output side for each period at the AND gate 314. An essentially square-wave alternating signal whose period correlates to the speed of movement or rotational speed of the encoder and whose signal edges correlate chronologically with the zero crossovers of the input signal therefore occurs as the output signal of the signal processing device 31.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An active sensor for switching over into a special operating mode comprising:
   at least one sensor element,
   one evaluation circuit,
   two connecting lines each having a terminal for transmitting sensor information, wherein a supply voltage of the sensor is applied to the two connecting lines,
   a switchover module that is configured to switch over between a normal operating mode and a special operating mode by reversing a polarity of the supply voltage which is applied to the two terminals.

2. The sensor as claimed in claim 1, wherein the switchover module has a rectifier circuit which is connected on an input side to the two connecting lines.

3. The sensor as claimed in claim 2, wherein the rectifier circuit is embodied as a bridge rectifier circuit with four Mos-FETs.

4. The sensor as claimed in claim 1, wherein the switchover module has at least a first comparator circuit for identifying the polarity of the supply voltage, wherein the first comparator circuit is directly or indirectly connected on an input side to the two connecting lines.

5. The sensor as claimed in claim 4, wherein the power supply terminals of the first comparator circuit, the evaluation circuit, or both circuits are connected to output terminals of the rectifier circuit.

6. The sensor as claimed in claim 1, wherein the switchover module has at least one reset device for evaluating the following with respect to at least one defined voltage threshold: (i) an operating voltage of the switchover module, (ii) an operating voltage of the evaluation circuit, or (iii) both the operating voltage of the switchover module and the operating voltage of the evaluation circuit.

7. The sensor as claimed in claim 6, wherein the switchover module has a switch device for switching over the operating mode, the switch device being configured to switch over an operating mode of the sensor as a function of an output of the first comparator circuit for identifying the polarity of the supply voltage and as a function of the output/outputs of the at least one reset device.

8. The sensor as claimed in claim 1, wherein the evaluation circuit has a signal processing unit comprising two hysteresis circuits in which a first and a second output signal (SIGA, SIGB) of the at least one sensor element are processed, wherein the two hysteresis circuits are connected in parallel and each comprise at least one comparator, wherein the first and second output signals (SIGA, SIGB) of the at least one sensor element are each applied to inputs of the two comparators interchanged with one another with respect to a non-inverting input and an inverting input.

9. The sensor as claimed in claim 8, wherein a voltage divider is connected to each of the inverting inputs of the two comparators of the hysteresis circuits, said voltage divider being composed of a first resistor and a second resistor at a first node between the two resistors, and wherein the first resistor is connected by the terminal, opposite the first node, to a signal line of the corresponding first or second output signal of the at least one sensor element and wherein the second resistor is connected by the terminal, opposite the first node, to a connecting terminal of a negative potential, of the supply voltage of the at least one sensor element, via a transistor, and in that a gate/base terminal of the transistor is connected to an output of the respective comparator, as a result of which a hysteresis effect is produced when the respective comparator is switched over.

10. The sensor as claimed in claim 9, wherein the first and second resistors of the two hysteresis circuits have, in each case on a paired basis, temperature coefficients which are different from one another.

11. The sensor as claimed in claim 9, wherein in each case the first resistor of the two hysteresis circuits is a temperature-independent resistor and the respective second resistor is a resistor with a defined, positive or negative temperature coefficient.

12. The sensor as claimed in claim 7, wherein the evaluation circuit comprises an interface circuit for setting a defined output signal of the sensor, and the interface circuit is actuated by the switch device as a function of the respective operating mode.

13. The sensor as claimed in claim 12, wherein the switch device switches off or leaves switched off the circuit branch of the interface circuit which is used to modulate the sensor output signal by means of the signal processing unit, in a first case when there is an operating voltage for the evaluation circuit below a defined threshold voltage and the polarity of the supply voltage which is applied to the sensor corresponds to the normal operating mode, and in a second case when there is an operating voltage of the evaluation circuit above a defined threshold voltage and the polarity of the supply voltage which is applied to the sensor corresponds to a special operating mode, by means of a switch of the interface circuit, and otherwise switches on or leaves switched on said circuit branch.

14. The sensor as claimed in claim 1, wherein the sensor has at least one sensor element, an evaluation circuit and two connecting lines, each with a terminal for transmitting the sensor information, wherein the sensor is configured to be operated in at least two operating modes and is both actuated and supplied with energy by the two connecting lines, wherein switching over is carried out between a normal operating mode and a special operating mode by reversing the polarity of the supply voltage applied to the two connecting lines.

15. The sensor as claimed in claim 14, wherein in order to determine an air gap between an encoder and the sensor, said sensor is switched over from the normal operating mode into a test operating mode by reversing the polarity of the supply voltage, after which the supply voltage is reduced, starting from a defined voltage value, until the sensor no longer supplies an output signal which is modulated by encoder movements and has a defined minimum amplitude.

16. The sensor as claimed in claim 14, wherein the sensor is switched over from the normal operating mode into a programming mode by reversing the polarity of the supply voltage, after which data for programming, calibrating, or programming and calibrating the sensor is transmitted from an electronic control unit (ECU) to the sensor.

17. The use of a sensor as claimed in claim 1 as a wheel speed sensor in motor vehicles.

18. A method for actuating an active sensor that is configured to be operated in at least two operating modes comprising the steps of:
transmitting sensor information over two connecting lines each having a terminal;
applying a supply voltage of the sensor to the two connecting lines; and
switching over between a normal operating mode and a special operating mode by reversing a polarity of the supply voltage which is applied to the two terminals,
wherein the transmission of the sensor information is controlled based on a switching state of an evaluation circuit which is determined based on a comparison between the supply voltage and a voltage threshold.

* * * * *